Figure 1:
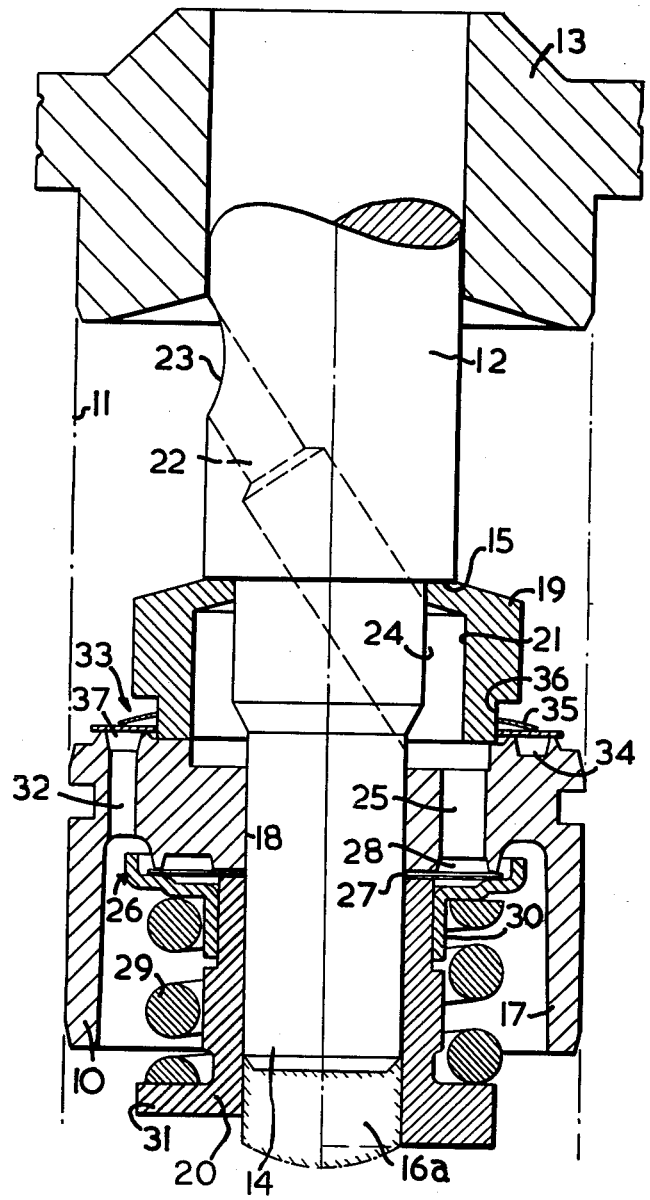

GEORGE B. POWELL
By: Scrivener & Parker

3,204,728
SHOCK ABSORBER WITH HYDRAULIC STOP
George Bertram Powell, Solihull, England, assignor to Girling Limited, Birmingham, England, a British company
Filed Oct. 29, 1962, Ser. No. 233,767
Claims priority, application Great Britain, Oct. 31, 1961, 38,838/61
5 Claims. (Cl. 188—96)

This invention relates to hydraulic dampers or shock absorbers including a piston and cylinder assembly.

Difficulty is experienced in reducing the piston speed as it approaches an end of the cylinder during reciprocable motion therein, whilst providing dampened flow of hydraulic medium from one side to the other of the piston during the remainder of the piston movement. One previous proposal, in a telescopic damper comprising a piston slidably fitted within the cylinder and a piston rod of small diameter slidably received in a sealing gland for the end of the cylinder, utilised an L-shaped transfer passage in the piston rod, the downstream end of the passage in the direction of dampened flow including a one-way poppet valve, the upstream end of the passage extending to the rod periphery between the gland and the piston so that hydraulic fluid could pass through the passage until the gland was reached towards the extremity of the piston stroke, the hydraulic fluid thereafter trapped between the gland and piston then acting as a "hydraulic stop."

The above arrangement, though having a number of practical advantages, also has a number of serious disadvantages. The angled liquid transfer passage is difficult to clean of swarf before assembly and requires close, accurate machining. The poppet valve requires a small diameter spring of consequent high rate, so that the valve is very sensitive to variations in tolerance, and since such valves usually require a number of components each valve has to be individually manually flow set.

The above arrangement is also found to be noisy in operation.

It is an object of the present invention to provide a damper incorporating an hydraulic stop together with a valve adapted for automatic setting.

According to the invention an hydraulic damper or shock absorber comprises a piston carried on a piston rod acting in a cylinder and having a transfer passage or transfer passages incorporating an hydraulic stop, wherein the downstream end of the or each transfer passage in the direction of dampened flow is controlled by a one-way valve having a closure member in the form of a flexing shim. The flexing shim is less noisy, cheaper and more adapted to consistent settings than the poppet type valve previously used. In practice one portion of the shim is clamped while the other, which is free to flex, covers the downstream end of the transfer passage. In contrast to the poppet type valve, this has the advantage of providing only a single flow path for the liquid. Furthermore, the spring-loading required for the shim valve is approximately only half that for the poppet type valve.

Preferably, the transfer passage instead of being L-shaped, is straight and extends across the piston rod obliquely to the axis thereof. However, the known L-shaped passage may still be used in conjunction with our invention.

Figure 2:
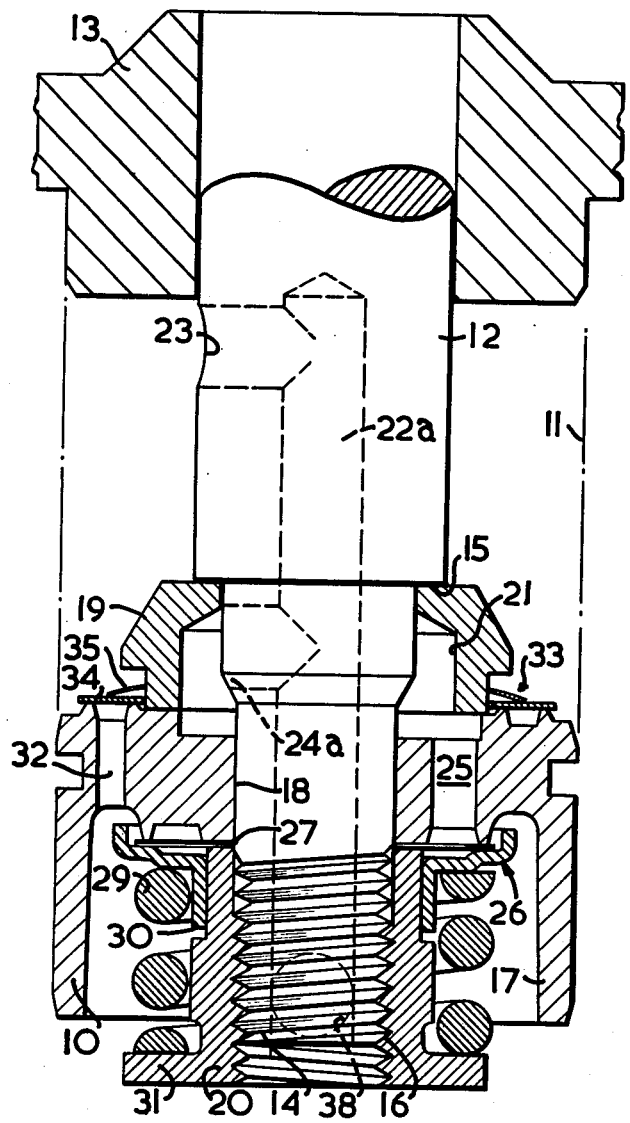

One embodiment of the invention will now be described by way of example with reference to the accompanying drawings, in which:

FIGURE 1 is a sectional view of a piston and cylinder assembly according to the invention, forming part of a telescopic hydraulic damper; and FIGURE 2 is a sectional view similar to FIGURE 1 of an alternative form of piston and cylinder assembly for a telescopic hydraulic damper.

Similar parts in both views will be indicated by the same reference numerals.

In both embodiments a piston assembly 10 is slidably mounted in a hydraulic cylinder 11 and carried on a piston rod 12. The piston rod 12 extends from the cylinder through a gland 13 and is of reduced diameter over a substantial length 14 to provide a shoulder 15 the extreme end of the reduced portion being formed with a screw thread 16. The piston has a skirt 17 and a central bore 18 which is a close fit on the reduced portion 14 of the rod. The piston is fixed on the rod between a collar 19 which abuts the shoulder 15 and a flanged sleeve nut 20 which engages the thread 16 on the end of the rod. In an alternative construction the nut 20 and the rod-end 14 may be unthreaded and the nut secured to the rod by, for example, welding, as indicated at 16a on the right hand side of FIGURE 1. Adjacent the crown of the piston the bore of the collar 19 is enlarged to form a substantially annular gallery 21.

In the embodiment shown in FIGURE 1 an oblique passage 22 extends through the rod 12 and one end of this passage opens on the surface of the piston rod between the piston 10 and the gland 13 as at 23 while the other end opens into the gallery 21 as at 24. The gallery 21 is in communication with a number of short narrow passages 25 which extend axially through the crown of the piston. The ends of the passages 25 remote from the gallery open into an annular groove 28 which is closed by a one-way valve generally indicated at 26, the valve being in the form of two shims or sheet metal rings 27, of equal size, the inner edges of which are clamped between the piston and the sleeve nut. The outer edges of the shims, which are able to flex towards and away from the piston, are normally held against the piston by the force of a helical spring 29 acting through an L-section thrust washer 30, the other end of the spring 29 being retained by a flange 31 of the sleeve nut 20.

In operation, as the piston 10 moves towards the gland 13 hydraulic fluid is transferred from one end of the cylinder to the other through the shim valve 26. This transfer of fluid is reduced and may eventually be stopped as the upstream end 23 of the oblique passage 22 passes into the gland 13.

A second series of axial passages 32 through the crown of the piston allow the transfer of fluid in the reverse direction. These passages 32 are disposed radially outwards of the passages 25 and open into an annular groove 37 in the upper face of the piston, this groove being closed by a one-way valve shown at 33. This valve is in the form of a sheet metal ring 34 which is located together with a spring washer 35 on a reduced section 36 of the outside diameter of the collar 19.

The piston and rod assembly shown in FIGURE 2 is similar in operation to that shown in FIGURE 1 but differs slightly in construction. The passage through the piston rod shown at 22 in FIGURE 1 need not be oblique although this is the preferred form. In the form shown in FIGURE 2 an L-shaped passage is provided by making an axial drilling 22a and a radial drilling 23a in the rod 12, further radial drillings 24a being made to permit communication between the axial drilling 22a and the gallery 21 when the collar 19 is assembled on the rod. The open end of the drilling 22a is permanently closed as by a ball 38.

Assuming the pressure-affected area of the piston to be 100% than the corresponding area of the inner passages should be between 0% and 5%, whilst the corresponding area of the outer passages should be between 5% and 20%, the preferred figures being 3% and 10% respectively. These ranges represent the free flow conditions through the valves which are best for effective operation.

The shim valve may comprise more than two shims.

The cylinder and piston assembly is associated in the usual way with a reservoir which keeps the cylinder full of liquid.

I claim:

1. A hydraulic damper comprising a cylinder, a piston slidable in said cylinder and dividing it into first and second spaces, a piston rod axially attached to said piston, an end wall on said cylinder closing said first space, a gland in said end wall, said piston rod extending through said first space and being slidable through said gland, said piston rod having a passage therein, said passage being straight and extending at an oblique angle to the axis of said piston rod, having first and second ends both opening into the lateral wall of said piston rod at opposite sides thereof, said first end opening into the wall of the piston rod at a point axially displaced from said piston in the direction of said gland, whereby the cooperation of said passage with said gland defines a hydraulic stop limiting the travel of said piston in said cylinder in the direction towards said end wall, said piston having therein an annular space around said piston rod, and said second end of said passage opening into said annular space, a first one-way valve in said piston allowing flow of liquid under pressure from said second space to said first space, a second valve allowing flow of liquid under pressure from said annular space to said second space and comprising at least one annular ring-shaped shim, means clamping a peripheral edge of said shim, and resilient means urging said shim to closed position.

2. A hydraulic damper as set forth in claim 1 comprising further a collar, said collar being disposed around said piston rod and engaging that end of said piston which is adjacent said first space, said annular space being defined between said collar and said piston.

3. A hydraulic damper as set forth in claim 1 wherein said piston rod extends through said piston into said second space, and furthermore through said helical coil compression spring.

4. A hydraulic damper as set forth in claim 1 wherein said piston rod extends through said piston into said second space and furthermore through said helical coil compression spring, and including abutment means on said piston rod, said abutment means being engaged by said spring.

5. A hydraulic damper as set forth in claim 1 wherein said piston rod extends through said piston into said second space and furthermore through said helical coil compression spring, a screw thread on said piston rod, and screwed abutment means, said abutment means having a threaded engagement with said piston rod and being engaged by said spring.

References Cited by the Examiner

UNITED STATES PATENTS

| | | | |
|---|---|---|---|
| 2,346,275 | 4/44 | Read et al. | 188—88 |
| 2,458,157 | 1/49 | Funkhouser | 188—100 |
| 2,546,038 | 3/51 | McIntyre et al. | 188—88 |
| 2,546,051 | 3/51 | Whisler | 188—88 |
| 2,668,604 | 2/54 | Chisholm | 188—88 |
| 2,888,107 | 5/59 | Koning et al. | 188—88 |
| 3,024,874 | 3/62 | Koning et al. | 188—100 |
| 3,057,441 | 10/62 | Pribonic et al. | 188—88 |

EUGENE G. BOTZ, *Primary Examiner.*

ARTHUR L. LA POINT, *Examiner.*